(12) United States Patent
Kim et al.

(10) Patent No.: US 8,224,391 B2
(45) Date of Patent: Jul. 17, 2012

(54) MOBILE TERMINAL HAVING AN LED BACKLIGHT UNIT

(75) Inventors: Sang Joon Kim, Seoul (KR); Byung Hyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 12/712,576

(22) Filed: Feb. 25, 2010

(65) Prior Publication Data
US 2011/0014955 A1    Jan. 20, 2011

(30) Foreign Application Priority Data

Jul. 20, 2009 (KR) .................... 10-2009-0065820
Jul. 20, 2009 (KR) .................... 10-2009-0065821

(51) Int. Cl.
*H04B 1/38* (2006.01)
*H04M 1/00* (2006.01)

(52) U.S. Cl. ............... 455/566; 455/90.3; 455/575.1; 455/556.1; 345/107; 345/169; 349/141; 349/106; 362/618; 362/625

(58) Field of Classification Search .......... 455/566, 455/90.3, 575.1, 556.1; 359/15; 345/107, 345/169; 349/141, 106; 362/618, 625
See application file for complete search history.

(56) References Cited

U.S. PATENT DOCUMENTS

| | | | |
|---|---|---|---|
| 6,678,534 B2 * | 1/2004 | Ishigaki | 455/556.1 |
| 6,685,093 B2 * | 2/2004 | Challa et al. | 235/462.46 |
| 7,148,875 B2 * | 12/2006 | Rosenberg et al. | 345/156 |
| 7,178,725 B2 * | 2/2007 | Vayrynen et al. | 235/382 |
| 7,345,250 B2 * | 3/2008 | Hakunti et al. | 200/5 A |
| 7,509,140 B2 * | 3/2009 | Elomaa | 455/550.1 |
| 7,521,863 B2 * | 4/2009 | Tanda | 313/512 |
| 7,737,375 B2 * | 6/2010 | Katori et al. | 200/5 A |
| 7,777,736 B2 * | 8/2010 | Fujita et al. | 345/207 |
| 7,828,473 B2 * | 11/2010 | Tanaka et al. | 362/612 |

(Continued)

FOREIGN PATENT DOCUMENTS

EP    2 034 399 A2    3/2009

(Continued)

OTHER PUBLICATIONS

European Search Report dated Nov. 3, 2010 issued in Application No. 10 00 4282.

*Primary Examiner* — Marceau Milord

(74) *Attorney, Agent, or Firm* — KED & Associates LLP

(57) ABSTRACT

A mobile terminal having a display unit provided with an LED backlight and controlling method thereof are disclosed. The present invention includes a housing, a display unit including a liquid crystal display provided to one side of the housing and a backlight unit including a plurality of light emitting diodes for a backlight provided to a backside of the liquid crystal display and a control unit controlling the backlight unit to selectively adjust brightness of the light emitting diodes in part. Accordingly, a mobile terminal according to at least one of embodiments of the present invention controls light emission of an LED backlight locally, thereby providing more various display visual effects. And, a mobile terminal according to one embodiment of the present invention is able to use at least one portion of the light emitted from an LED BLU of a display unit as an illumination of a main body without using a separate light source for external illumination. Moreover, the illumination of the main body is able to play a role as a transmitter in a visible light communication.

16 Claims, 10 Drawing Sheets

(a)

(b)

U.S. PATENT DOCUMENTS

| | | | | |
|---|---|---|---|---|
| 7,834,853 B2 * | 11/2010 | Finney et al. | | 345/169 |
| 7,864,273 B2 * | 1/2011 | Kim et al. | | 349/114 |
| 7,874,683 B2 * | 1/2011 | Noba | | 353/39 |
| 7,876,199 B2 * | 1/2011 | Caine | | 340/407.2 |
| 7,893,928 B2 * | 2/2011 | Im | | 345/173 |
| 7,903,093 B2 * | 3/2011 | Kim et al. | | 345/173 |
| 7,911,553 B2 * | 3/2011 | Tanaka | | 349/58 |
| 7,953,448 B2 * | 5/2011 | Pletikosa et al. | | 455/564 |
| 7,980,749 B2 * | 7/2011 | Chiu et al. | | 362/632 |
| 7,991,147 B2 * | 8/2011 | Emmert | | 379/433.01 |
| 2003/0052903 A1 | 3/2003 | Weast | | 345/690 |
| 2003/0146897 A1 | 8/2003 | Hunter | | 345/102 |
| 2007/0146344 A1 | 6/2007 | Martin et al. | | 345/173 |

FOREIGN PATENT DOCUMENTS

WO    WO 2005/024765 A2    3/2005

* cited by examiner (a)

(b)

(a)

(b)

(c)

(a)

(b)

(a)

(b)

(a)

(b)

(c)

MOBILE TERMINAL HAVING AN LED BACKLIGHT UNIT

Pursuant to 35 U.S.C. §119(a), this application claims the benefit of earlier filing date and right of priority to Korean Application Nos. 10-2009-0065820 and 10-2009-0065821, both filed on Jul. 20, 2009, the contents of which are hereby incorporated by reference herein in their entirety.

BACKGROUND OF THE INVENTION

1. Field of the Invention

The present invention relates to a mobile terminal and controlling method thereof, and more particularly, to a mobile terminal having a display unit provided with an LED backlight.

2. Discussion of the Related Art

Generally, terminals can be classified into mobile/portable terminals and stationary terminals according to mobility. The mobile terminals can be classified into handheld terminals and vehicle mount terminals according to user's handheld portability.

As functions of the terminals are diversified, the terminals are implemented into multimedia players provided with complex functions for photo/video photographing, playback of music/video file, game, broadcast reception and the like for example.

In order to support and enhance the terminal functions, structural and/or software improvements for the terminal can be taken into consideration.

Recently, a backlight for illumination of a display unit in a mobile terminal tends to adopt a light emitting diode (LED). And, the backlight enables a mobile terminal to be equipped with more convenient and various functions.

SUMMARY OF THE INVENTION

Accordingly, the present invention is directed to a mobile terminal that substantially obviates one or more problems due to limitations and disadvantages of the related art.

An object of the present invention is to provide a mobile terminal, by which various display visual effects can be provided.

Another object of the present invention is to provide a mobile terminal, by which an external illumination is enabled without a separate light emitting device for illumination.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a housing, a display unit including a liquid crystal display provided to one side of the housing and a backlight unit including a plurality of light emitting diodes for a backlight provided to a backside of the liquid crystal display, and a control unit controlling the backlight unit to selectively adjust brightness of the light emitting diodes in part.

In another aspect of the present invention, a mobile terminal includes a display unit including a liquid crystal display (LCD) and a backlight unit including a plurality of light emitting diodes provided to a backside of the liquid crystal display, at least one light-transmissive region formed of a light-transmissive material to enable at least one portion of a light emitted from a plurality of the light emitting diodes to pass through externally, and a control unit controlling at least one of a brightness and a flickering pattern of the light emitting diode located at a position corresponding to at least one external illumination part among a plurality of the light emitting diodes to be changed to cause a prescribed visual effect to each of the at least one external illumination part when a prescribed function is executed.

In another aspect of the present invention a mobile terminal according to the present invention includes a housing, a display unit including a liquid crystal display provided to one side of the housing and a backlight including a plurality of light emitting diodes for a backlight provided to a backside of the liquid crystal display, and a control unit, in order for a prescribed data to be externally delivered by a visible light communication (VLC) scheme, controlling at least one portion of a plurality of the light emitting diodes to flicker to correspond to the prescribed data.

Preferably, the housing includes a light-transmissive region for enabling a portion of light generated from a plurality of the light emitting diodes to pass through the housing externally.

More preferably, the light-transmissive region is provided to at least one selected from the group consisting of a periphery of the display unit, a lateral side of the housing and a backside of the housing.

In this case, the mobile terminal further includes at least one selected from the group consisting of a prism, reflector, diffusing place, lens, optical fiber and a light guide plate to deliver the light generated from a plurality of the light emitting diodes to the light-transmissive region.

Preferably, the mobile terminal further includes a receiving unit using an optical device converting an externally received flickering signal of a visible ray band to an electric signal. In this case, the control unit is able to control the electric signal to be recovered into a digital data.

In a further aspect of the present invention, a method of controlling a mobile terminal includes the steps of determining a data to be transmitted by a visible light communication (VLC), converting the determined data to a prescribed pulse signal, and enabling at least one portion of a plurality of light emitting diodes (LED) configuring a backlight unit (BLU) of a display unit to emit light to correspond to the pulse signal.

Preferably, the method further includes the steps of converting an externally received flickering signal of a visible ray band to an electric signal and recovering the electric signal into a digital data.

In a still further aspect of the present invention, a terminal, in particular mobile terminal according to the present invention includes a housing, a display unit including a liquid crystal display provided to one side of the housing and a backlight unit including a plurality of light emitting diodes for a backlight provided to a backside of the liquid crystal display, and a control unit adapted to control the backlight unit to selectively adjust brightness of the light emitting diodes in part.

Accordingly, the present invention provides the following effects and/or advantages.

First of all, a mobile terminal according to at least one of embodiments of the present invention controls light emission of an LED backlight locally, thereby providing more various display visual effects and a power consumption saving effect.

Secondly, a mobile terminal according to one embodiment of the present invention is able to provide more various visual effects without a separate light source for external illumination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example further description will be with regard to a mobile terminal 100, and it should be noted that such teachings may apply equally to other types of terminals.

Figure 1:
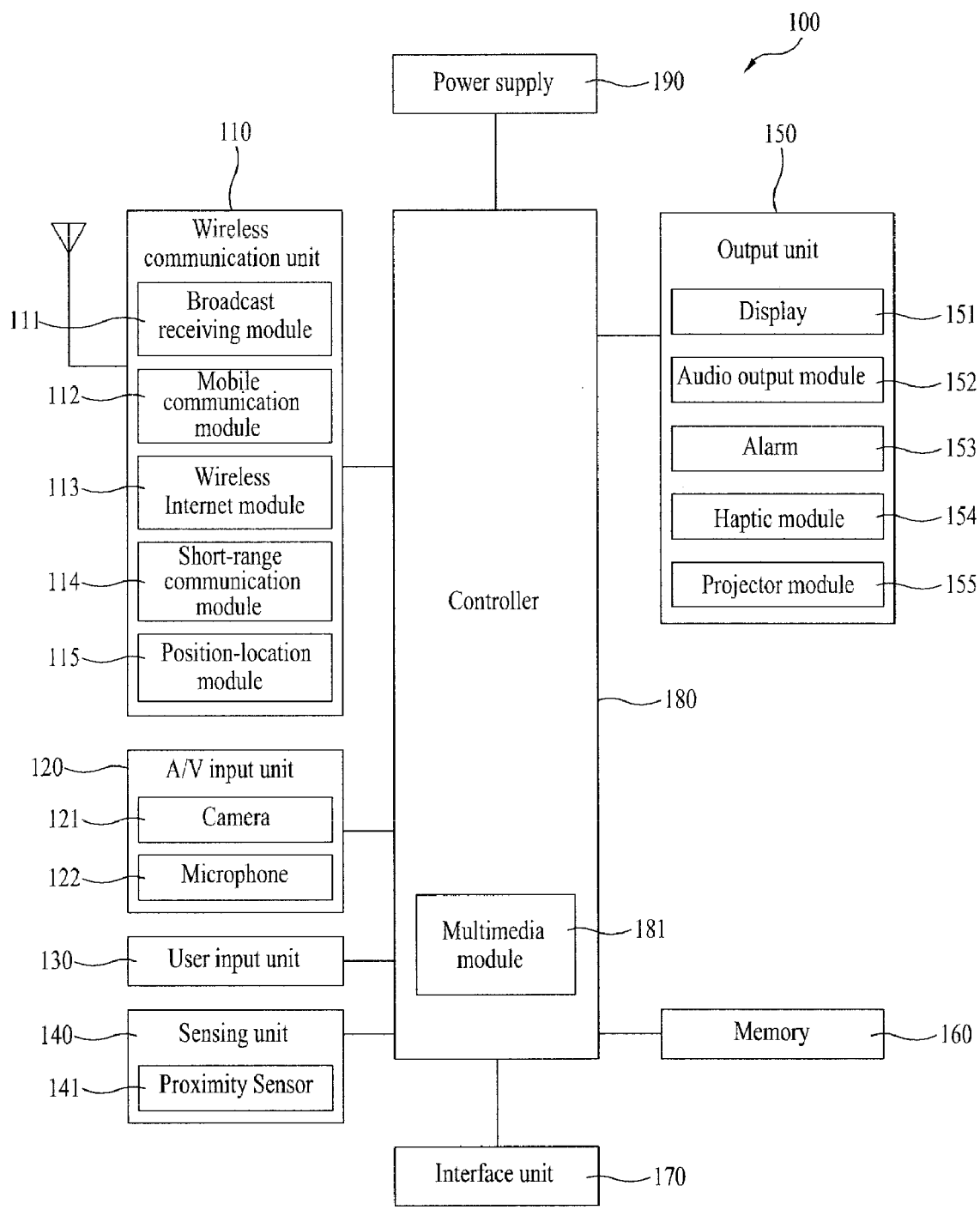
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of t h e controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
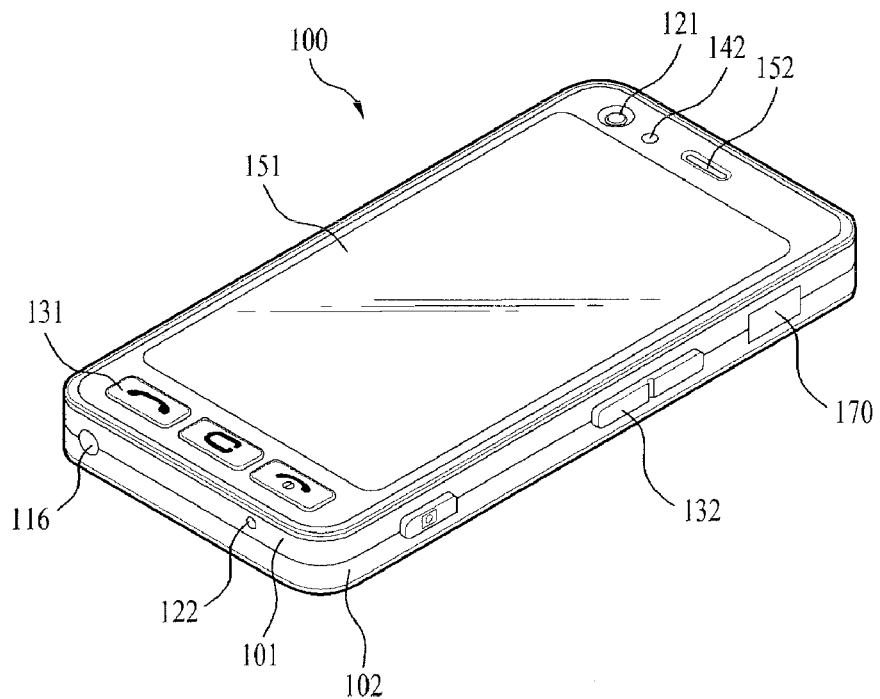
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
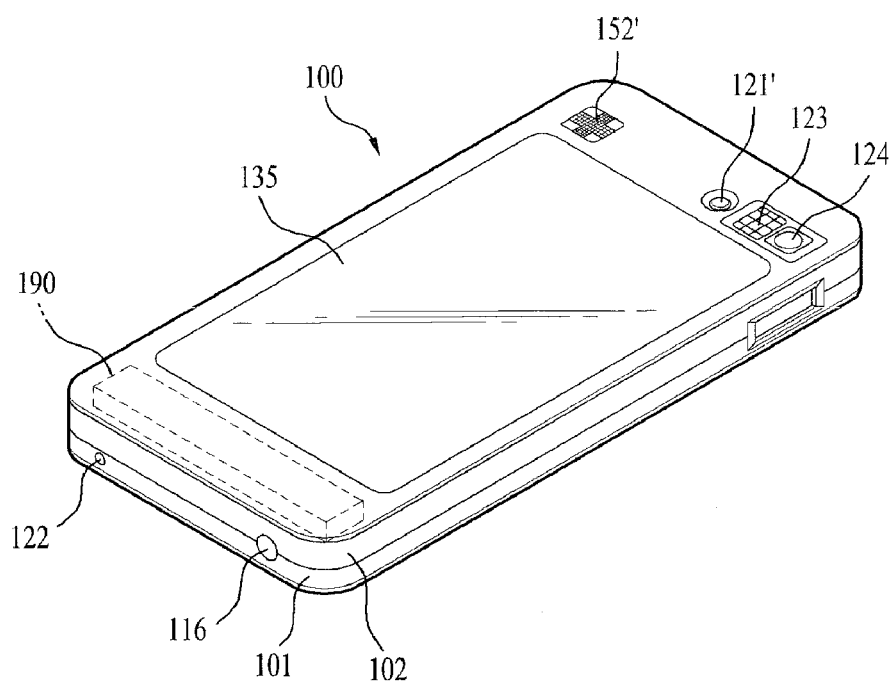
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmissive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Interconnected operational mechanism between the display 151 and the touchpad 135 are explained with reference to FIG. 3 as follows.

Figure 3:
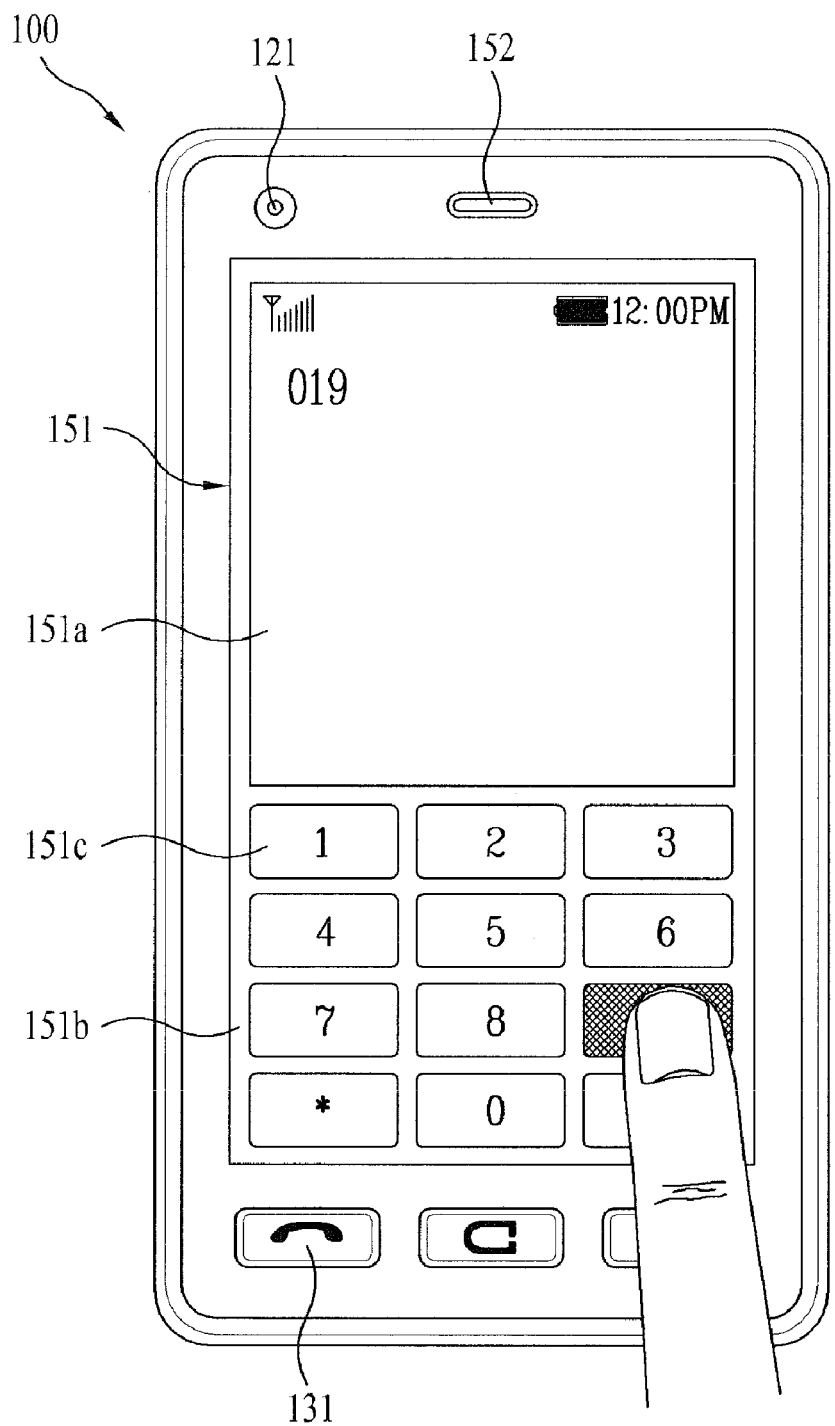
FIG. 3 is a front diagram of a mobile terminal for explaining one operational status of the mobile terminal according to one embodiment of the present invention.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

Meanwhile, in the manipulation of a touchscreen, 'pointer' or 'cursor' is frequently used as an arrow mark indicating a specific position by being displayed on a display unit. In this disclosure, in order to discriminate 'pointer' and 'cursor' from each other, a figure or the like, which is displayed on a display unit to indicate a specific position, is named 'cursor'. And, a user's finger, a stylus pen or the like, which is used to physically apply a contact touch or a proximity touch to a specific point of a touchscreen, is named 'pointer'.

Generally, a liquid crystal display (hereinafter abbreviated LCD) is used as the display unit 151 of the mobile terminal 100. LCD is a non-light-emitting electronic display device failing to emit light by itself. In order to implement good quality of vivid and natural colors of a moving picture, the LCD needs an additional light source. For this, a backlight plays a role as the light source. In order to apply light from a backside of the LCD, provided is a complex structure including a light source, a power circuit for driving the light source and a series of parts for generating a planar light. This complex structure is named a backlight unit (hereinafter abbreviated BLU).

The BLU can be categorized into a direct type or an edge type according to an arranged type in association with an LCD panel.

First of all, the direct type is explained. The direct type BLU is mostly characterized in that a light source for applying light to an LCD panel is located at a position for directly applying light from a backside of the LCD panel. The direct type BLU can include a backlight lamp as a light source, a reflector for reflecting light of the backlight lamp and a diffusing plate for diffusing the reflected light evenly.

Secondly, the edge type is explained. The edge type BLU is mostly characterized in that a light source is located at a lateral side of an LCD panel. Light generated from the light source located at the lateral side is applied as a planar light to the LCD panel via a light guide plate for carrying the light. The edge type is more advantageous than the direct type in slimness.

Cold cathode fluorescent lamp (CCFL) has mainly been used as the backlight lamp that is a core part of the BLU. The cold cathode fluorescent lamp includes a glass tube having its inner side coated with a fluorescent material. Electrodes are attached to both ends of the glass tube. And, high-pressure mixed gas and Hg of constant quantity are enclosed within the glass tube. If a power is applied to the cold cathode fluorescent lamp, electrons from the electrode collide with Hg to generate UV ray. The generated UV ray reacts with the fluorescent material to generate visible rays.

Recently, the cold cathode fluorescent lamp is being replaced by a light emitting diode (hereinafter abbreviated LED), which is a semiconductor device using effect of electric field light emission. A BLU adopting the LED is more advantageous than the CCFL BLU in low power consumption, high color reproducibility and excellent response speed.

The present invention relates to a mobile terminal including a display unit provided with the LED BLU, whereby various visual effects and more convenient user environments using the same can be provided.

And, the present invention relates to a mobile terminal capable of performing a visible light communication using an LED BLU as a transmitting side of the visible light communication.

First of all, various visual effects and more convenient user environments using the same are explained in the following description.

First Embodiment

According to one embodiment of the present invention, a mobile terminal and controlling method thereof are provided, by which a prescribed visual effect can be generated in a manner of locally controlling a dimming of an LED BLU (light emitting diode backlight unit) of a display.

First of all, a visual effect using a local dimming is explained as follows.

Figure 4:
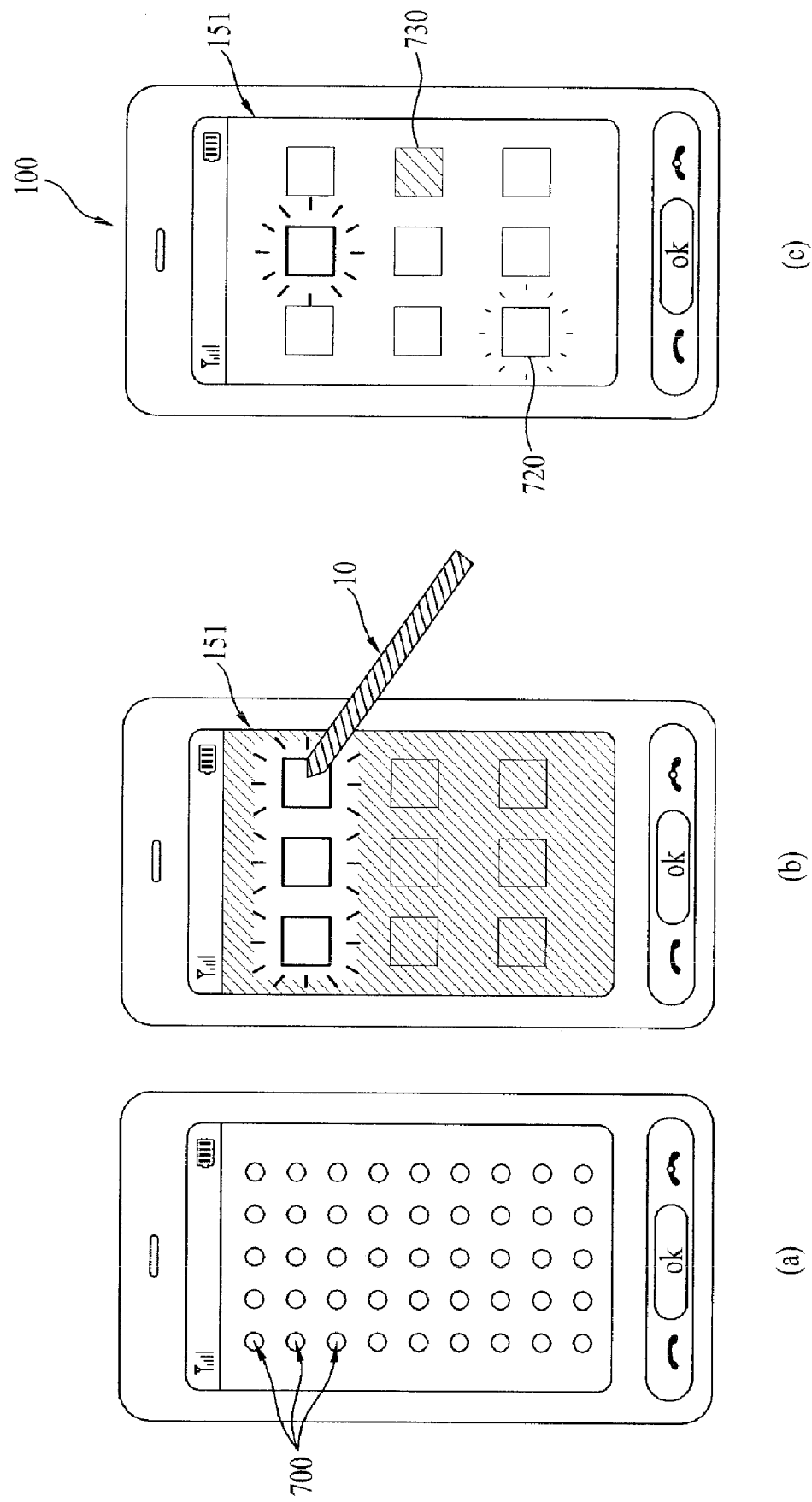
FIG. 4 is a diagram for one example of a visual effect using local light emission control of a BLU LED according to one embodiment of the present invention.

FIG. 4 is a diagram for one example of a visual effect using local light emission control of a BLU LED according to one embodiment of the present invention.

Referring to (a) of FIG. 4, LEDs are arranged in a check shape to construct a direct type BLU. If this BLU structure is used, brightness or flickering of each of the LEDs is individually controlled by the controller 180 to cause a prescribed visual effect according to a local brightness difference or a light emitting pattern difference on the display unit 151 provided over the BLU.

For instance, referring to (b) of FIG. 4, it is able to cause a visual effect according to a touched point or a trace of a touch in a manner that LEDs located right below a portion of the touchscreen 151, to which the touch is applied, are controlled to be brighter than others around the corresponding LEDs. In doing so, if the brightness of LEDs located farther from the touch applied portion are controlled to decrease gradually, it is able to obtain a visual effect of natural gradation.

For another instance, in order to obtain a bigger brightness difference, the controller 180 enables LEDs corresponding to one portion except a touch-applied portion to be further dimmed down or turned off.

For another instance, in consideration of saving a power consumption attributed to light emission of a backlight, it is able to dim down or turn off LED located right below a point touched with such a pointer as a finger, a stylus pen and the like. This is because the touched point is blocked by the pointer itself. In doing so, the controller 180 controls LEDs around the other LEDs located right below the touched point to get brighter than their surrounding.

In case that the touchscreen 151 is able to discriminatively recognize a contact touch and a proximity touch (e.g., in case of an electrostatic touchscreen), it is able to differentially set a brightness of a contact touch applied case to differ from a brightness of a proximity touch applied case. In case that a proximity of a pointer is detected on the touchscreen 151 capable of recognizing a proximity touch, the controller 180 is able to generate a visual effect attributed to the proximity of the pointer in a manner of dimming up the LEDs related to illumination of a pointer proximate point to be brighter than their surrounding. Moreover, in case that the touchscreen 151 is able to recognize a proximity distance from the pointer according to a plurality of steps, the controller 180 enables LEDs corresponding to the proximity point to be emit more light than LEDs corresponding to a region except the proximity point if the pointer get closer to the touchscreen 151.

For another instance, referring to (c) of FIG. 4, when a plurality of shortcut icons are displayed on the display unit 151, it is able to adjust brightness of an LED located at a position corresponding to each of a plurality of the shortcut icons in order of a decreasing preference. In particular, the brightness of the LED corresponding to a position, at which the icon 710 having the highest preference is displayed, is controlled to be brightest. And, the icon 720 having a relatively high preference can be controlled to get dimmer than the former icon 710 having the highest preference but brighter than the normal icons. Moreover, it is able to control the LEDs locally in a manner that the icon 730 having a low preference is dimmer than the icons having normal preferences. Thus, a method of applying brightness or flickering differentially or locally is applicable to a menu configured with text as well as the icons.

Figure 5:
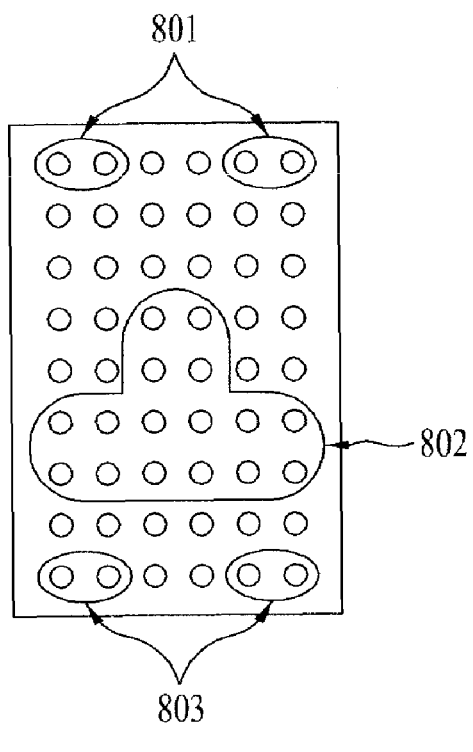
FIG. 5 is a diagram for another example of a visual effect using local light emission control of a BLU LED according to one embodiment of the present invention.
Figure 5:
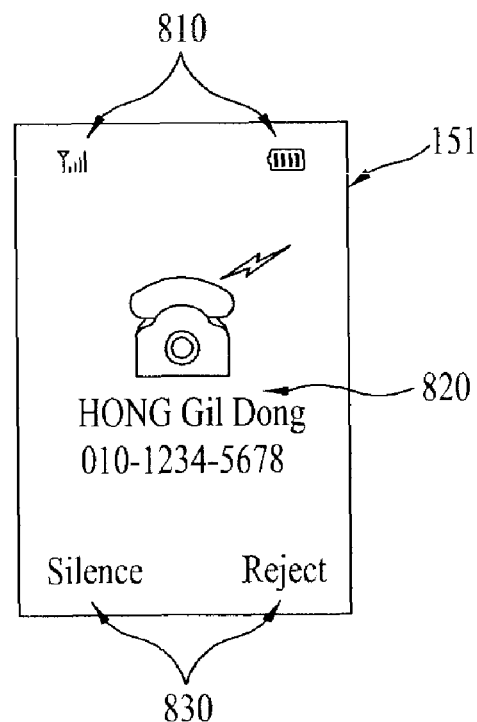

FIG. 5 is a diagram for another example of a visual effect using a local light emission control (local dimming) of a BLU LED according to one embodiment of the present invention.

In (a) of FIG. 5, shown is a BLU LED of a direct type using a plurality of LEDs arranged in a prescribed array. In (b) of FIG. 5, shown is a configuration of a display 151 of an LCD placed over an LED BLU. Referring to (b) of FIG. 5, a plurality of indicators 810 including a reception sensitivity, a battery status and the like are arranged at the top side of the display 151. An information 820 on a phone icon indicating an activated call status according to a use of a call function and a call correspondent party is displayed in the middle part of the display 151. And, a plurality of menus 830 related to the all function are displayed on a bottom side of the display 151.

In this case, using the local dimming of the LED BLU, it is able to deliver information more clearly in a manner of controlling the LEDs corresponding to the parts having the icon and menu text displayed thereon to get bright and controlling the LEDS corresponding to the rest of the parts to get dimmer than the former LEDs. For instance, the controller 180 controls the LED 801 corresponding to the indicator 810, the LED 802 corresponding to the information on the phone icon and the call correspondent party 820 and the LED 803 corresponding to the menu 830 to get bright. The rest of the LEDs are dimmed down or turned off, whereby information necessary for a user can be clearly displayed on the display 151. Moreover, it is able to obtain a power saving effect.

Meanwhile, in order to provide a bigger power saving effect, the mobile terminal according to the present invention is able to perform a power saving function of gradually decreasing brightness of a whole BLU at an occurring time of a specific event or in proportion to a time of having no input from a user via the user input unit 130. In this case, the specific event includes one of an arrival of a message or email, an incoming voice or video call, an expiration of a preset alarm time and the like for example. Exceptionally, an LED corresponding to a region for displaying a watch frequently checked by a user can be set not to have a power saving function applied thereto or to emit light at a constant brightness all the time.

The application of the above-described local dimming is non-limited by an indicator, an icon or a menu. And, the local dimming is applicable to any object that needs to be emphasized more than other parts. For instance, when a short text message or an email is checked, it is able to locally control the light emission of the LED to enable a touched row to be seen bright. In case of reading an e-book, it is able to control the light emission of the LED in a manner that a touched paragraph is seen brighter than other paragraphs. In case of reading a webpage, it is able to control the light emission of the LED in a manner that a touched block is seen brighter than the rest of the webpage.

Moreover, a relative brightness of a position, size and/or controlled part of the local dimming can be customized by a user.

Second Embodiment

According to another embodiment of the present invention, provided is a mobile terminal and controlling method thereof, by which at least one portion of light generated from an LED BLU of a display unit can be used as an illumination of a main body instead of using a separate light emitting device for the illumination.

The LED BLU is designed to have a structure capable of applying light generated from a normal LED to a backside of an LCD evenly. And, it is able to apply at least one portion of the light generated from this LED BLU to an inner wall of an outer case (i.e., a housing) of a mobile terminal as well as to the LCD. In this case, the inner wall, to which the light generated from the LED BLU is applied, can be formed of a light-transmissive material enabling at least one portion of the light, which arrives at the inner wall, to pass through itself. Thus, it is able to cause an illumination effect to the mobile terminal externally using the light generated from the LED BLU without the separate light emitting device for illumination. This is explained with reference to FIG. 6 and FIG. 7.

Figure 6:
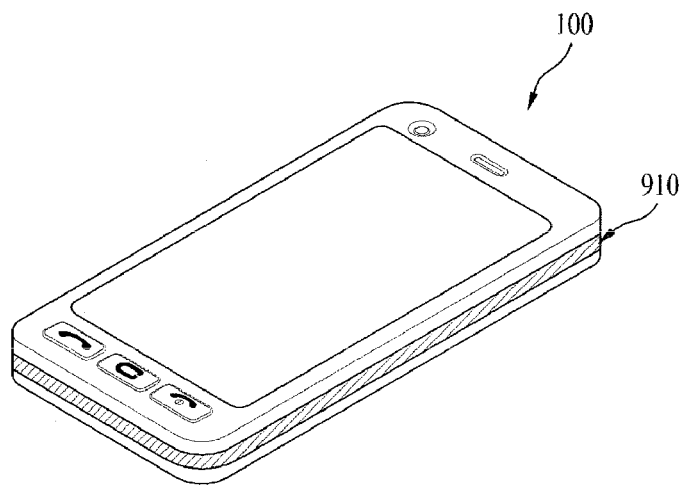
FIG. 6 is a diagram for examples of an illumination type using light of an LED BLU in an outer case of a mobile terminal according to another embodiment of the present invention.
Figure 6:
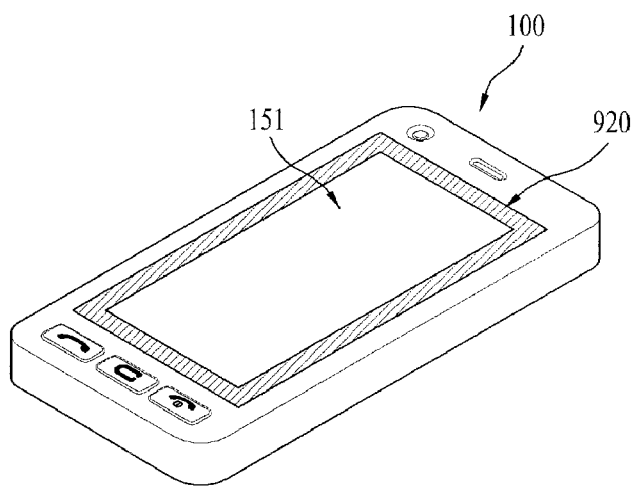
Figure 6:
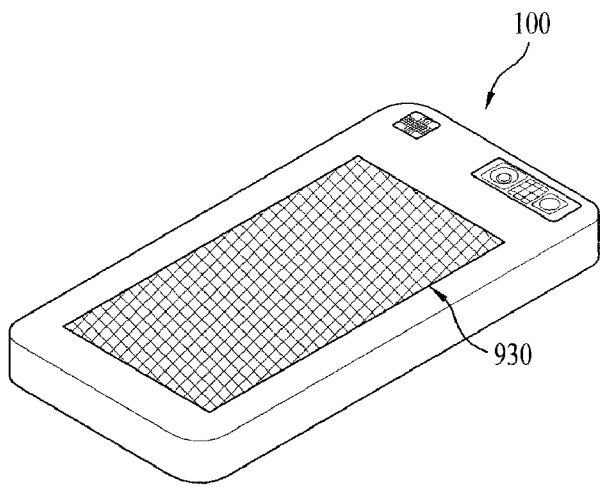

FIG. 6 is a diagram for examples of an illumination type using light of an LED BLU in an outer case of a mobile terminal according to another embodiment of the present invention.

First of all, in order to achieve an illumination effect using the light generated from an LED BLU, a light-transmissive material can be used for an side face 910 of the mobile terminal 100 [(a) of FIG. 6], or for an edge 920 of a display unit 151 [(b) of FIG. 6]. Moreover, a light-transmissive material can be used for a prescribed region 930 of a backside of a mobile terminal 100 [(c) of FIG. 6]. According to the present invention, a location of the light-transmissive material enabling the light generated from the LED BLU to be used as an external illumination is non-limited by the location described with reference to FIG. 6 but can include a combination of at least two of the, respective locations.

In the following description, explained is an example of a process that a light generated from an LED BLU arrives at an outer case formed of a light transmissive material.

Figure 7:
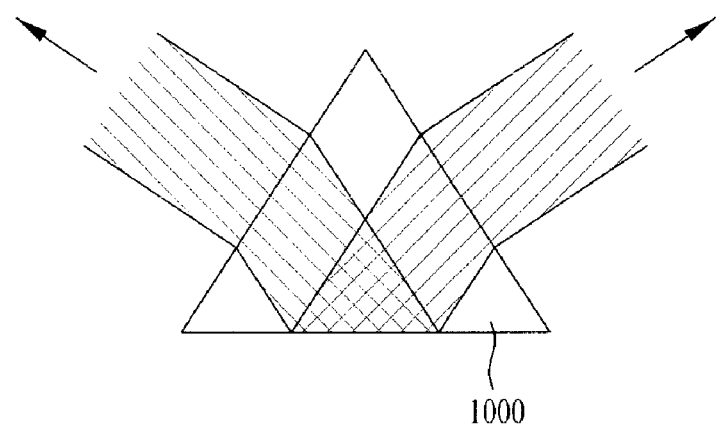
FIG. 7 is a diagram of a process that a light generated from an LED BLU arrives at an outer case formed of a light transmissive material according to another embodiment of the present invention.
Figure 7:
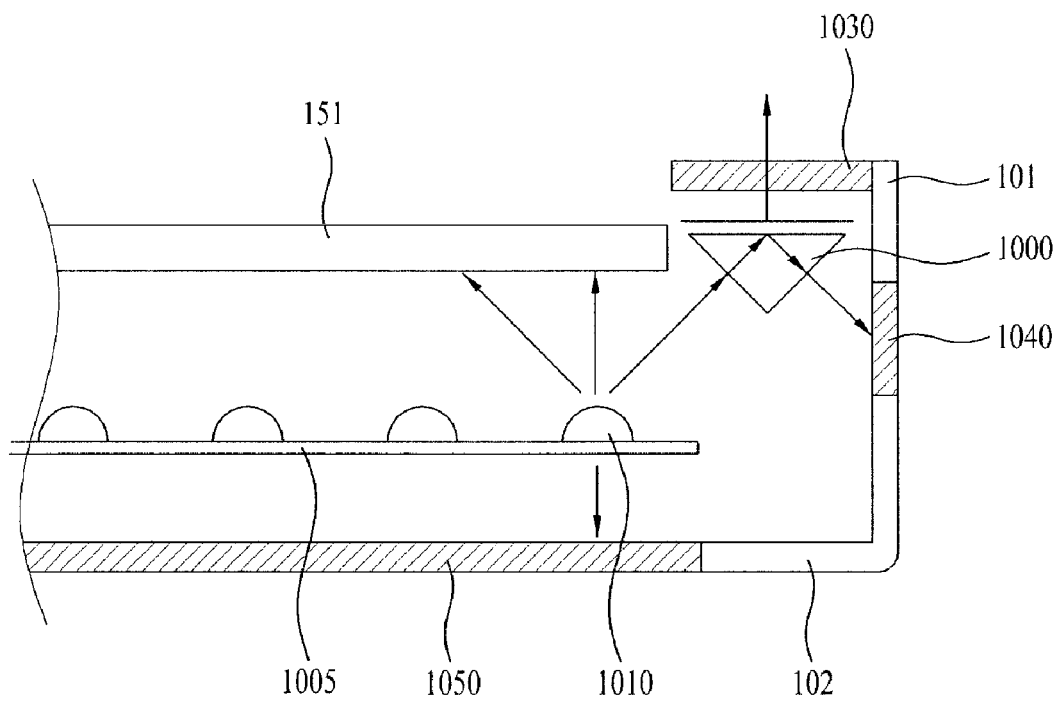

FIG. 7 is a diagram of a process that a light generated from an LED BLU arrives at an outer case including at least one part formed of a light transmissive material according to another embodiment of the present invention.

First of all, to enable the light generated from an LED BLU to reach an inner wall formed of a light-transmissive material provided to a prescribed position of an other case, it is able to use a prism 1000 shown in (a) of FIG. 7. In this the prism 1000 is able change a propagation direction of an externally incident light by having it reflected internally. If the prism is placed in a suitable form in consideration of a position relative to the LED BLU provided within a mobile terminal, a portion of the light generated from the LED BLU can reach the light-transmissive material of the outer case to provide an illumination effect.

In (b) of FIG. 7, it is assumed that a case where an outer case of a mobile terminal includes an upper pate and a lower plate 102. And, assume that a direct type LED BLU 1005 is provided as a backlight to a backside of an LCD 151. The light generated from an LED 1010 located at an edge of the LED BLU 1005 including a plurality of LEDs changes its propagation direction via a prism 1000 and is then able to arrive at a light-transmissive material 1030 around the LCD 151 or a light-transmissive material 1040 located at one lateral side of an outer wall. The LED BLU can be constructed to have a structure for delivering the light of LED in a direction opponent to the LCD directly/indirectly. In this case, it is able to cause an illumination effect through a light-transmissive material 1050 located at the backside of the mobile terminal.

A means for adjusting a direction of the light generated from the LED BLU is non-limited by the above described prism but can include such a means for changing a propagation direction of light as a reflector, a diffusing place, a light guide plate (LGP), an optical fiber and the like.

The external illumination adopting the above described backlight LED is able to cause various visual effects by interconnecting to a prescribed function or event executed in the mobile terminal 100. This is explained with reference to FIG. 8 as follows.

Figure 8:
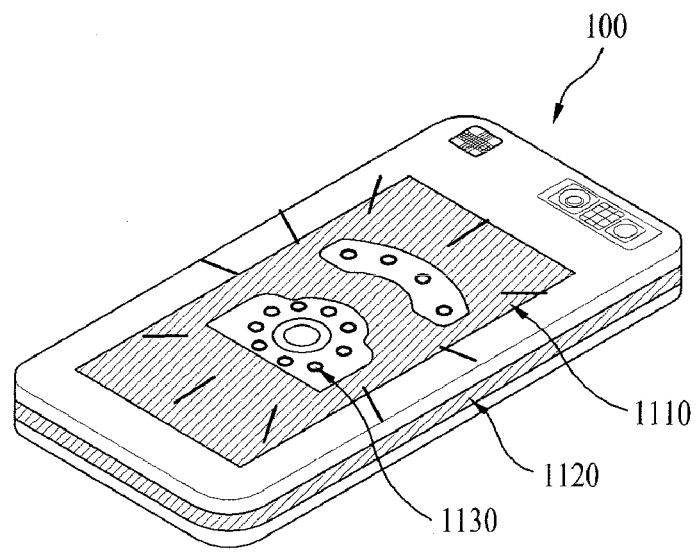
FIG. 8 is a diagram for examples of utilizing an external illumination using a light generated from an LED BLU according to another embodiment of the present invention.
Figure 8:
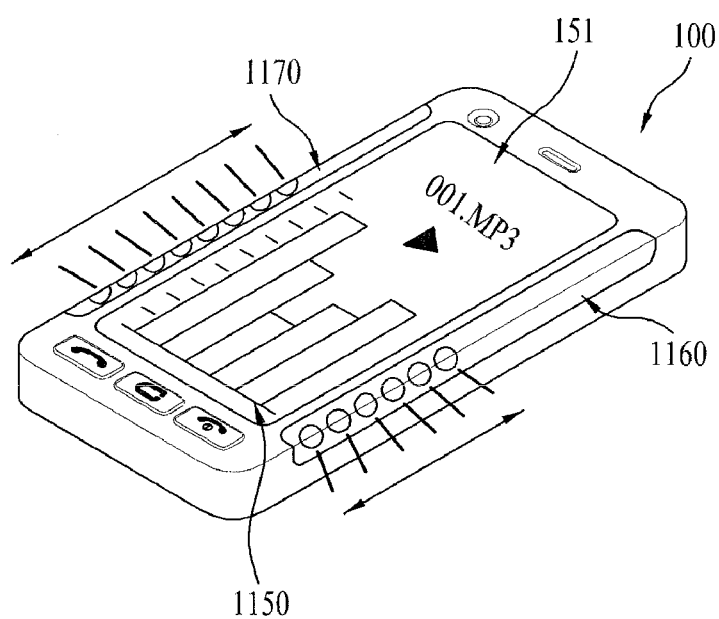

FIG. 8 is a diagram for examples of utilizing an external illumination using a light generated from an LED BLU according to another embodiment of the present invention.

Referring to (a) of FIG. 8, portions 1110 and 1120 of a lateral side and backside of a mobile terminal 100 can be formed of a light-transmissive material enabling a light generated from an LED BLU to be used for an external illumination. If a specific event occurs in the mobile terminal 100, the mobile terminal 100 is able to cause various visual effects to the external illumination in a manner of changing a brightness of partial LEDs of the LED BLU or flickering the LEDs of the LED BLU in part.

For instance, if the mobile terminal 100 receives an incoming call, the controller 180 is able to control the LEDs of the LED BLU in part to display or flicker a phone shape 1130 on the light-transmissive material part provided to the backside.

For another instance, if the mobile terminal 100 includes the sensing module 140 capable of detecting a posture (e.g., a direction against a ground, an inclination degree against a ground, etc.) of the mobile terminal 100, the controller 180 is able to cause a visual effect to the external illumination in consideration of the posture of the mobile terminal 100. In particular, referring to (a) of FIG. 8, the controller 140 is able to detect that the backside of the mobile terminal 100 faces upward. In order to inform a user of this posture, the controller 180 controls some of the LEDs of the LED BLU to cause a prescribed figure, a prescribed character or an animation effect using the figure and character to the light-transmissive material part 1120.

Referring to (b) of FIG. 8, assume a case that external illumination parts 1160 and 1170 formed of light-transmissive material are provided to edges of both lateral sides of a display unit of a mobile terminal 100. In this case, the external illumination parts 1160 and 1170 use the light generated from an LED BLU. If a music play mode is entered in the mobile terminal 100, a prescribed graph 1150 indicating a volume per range, a ratio of right to left sound in stereo mode or the like can be displayed on the display unit 151. The controller 180 enables both of the external illumination parts 1160 and 1170 to interconnect to the graph 1150, thereby enabling a visual effect (visualization) to be caused according to the ratio or volume per range of the currently played music.

To implement this, the controller 180 controls each LED of the LED BLU affecting the external illumination directly/indirectly to change intensity or size of the light in consideration of the corresponding range or the levels of the right and left volumes. Therefore, the visual effect can be caused to the external illumination parts.

For instance, the controller 180 enables a low-pitched part of the currently played music to interconnect to the left external illumination part 1170 and enables a high-pitched part of the currently played music to interconnect to the right external illumination part 1160. In particular, the controller 180 enables the light to be strengthened or enables light emission to be performed on a wide area of the external illumination part 1170 in a manner of controlling the LEDs of the LED BLU affecting the left external illumination part 1170 at the moment that the low-pitched part of the currently played music is dominant. On the contrary, the controller 180 enables the light to be weakened or enables light emission to be performed on a narrow area of the external illumination part 1170 in a manner of controlling the LEDs of the LED BLU affecting the left external illumination part 1170 at the moment that the low-pitched part of the currently played music is not dominant.

The external illumination effect using the LED BLU of the present invention is non-limited by the above described embodiments and is applicable in various types to other functions of the mobile terminal according to an occurrence of such an event as a game, a video viewing, a call, a message reception and the like.

Moreover, the external illumination effect using the LED BLU of the present invention is able to perform a function of a transmitting side of a visible light communication (hereinafter abbreviated VLC). In the following description, an embodiment for applying the present invention to the visible light communication is explained in detail.

Third Embodiment

According to a further embodiment of the present invention, provided is a mobile terminal and controlling method thereof, by which a visible light communication can be performed using the light generated from an LED BLU of a display unit.

The concept of the visible light communication (VLC) is explained as follows.

First of all, the visible light communication technology is a sort of a communication technology for delivering information using a wavelength of a visible ray. By enabling an LED to flicker at an pre-determined frequency, data can be exchanged. Therefore, a fast data communication can be performed wherever an LED illumination can be provided. Although this visible light communication uses wavelength of 280~780 nm most similar to that of an infrared communication (IrDA) that used wavelength of 870~900 nm, it is characterized or advantageous in that a communication and illumination can be simultaneously performed. The visible light communication is also advantageous in having almost no electric wave effect on a human body and devices, having a light arriving range correspond to a communication available range for safe security, and facilitating a frequency reuse.

As mentioned in the foregoing description, since the visible light communication uses LED, if an LED BLU of a display unit is used as a light source, a mobile terminal is able to work as a transmitting side of the visible light communication without a separate LED for the visible light communication.

A structure of a visible light communication module capable of performing the visible light communication is explained with reference to FIG. 9 as follows.

First of all a transmitting function of the visible light communication module is explained.

Figure 9:
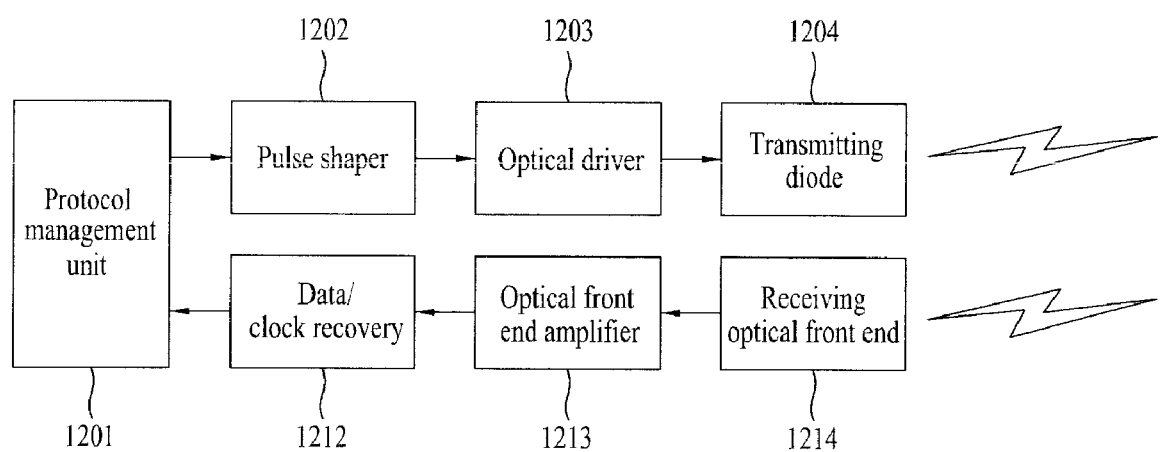
FIG. 9 is a block diagram for an example of a visible light communication module structure.

FIG. 9 is a block diagram for an example of a visible light communication module structure.

Referring to FIG. 9, a protocol management unit 1201 performs a function of controlling overall functions of a visible light communication module. The protocol management unit 1201 receives data, which is to be transmitted via a visible light communication, from the controller 180 and is then able to determine a transmission sequence and modulation and coding schemes.

A pulse shaper 1202 is able to transform the data, which is to be transmitted, into a pulse signal according to the pre-determined modulation and coding schemes. The pulse signal transformed from the data is delivered to an optical driver 1203. The optical driver 1203 enables a transmitting diode 1204 to emit light to meet at least one of the light intensity and specific frequency corresponding to the delivered pulse signal.

A receiving function of the visible light communication module is explained as follows.

First of al, a visible light signal can be transformed into an electric signal via a receiving optical front end 1214. In this case, a semiconductor light receiving device is usable as the receiving optical front end 1214. For example, such an image sensor as a CMOS, a CCD and the like is usable as the semiconductor light receiving device. And, a is usable as the semiconductor light receiving device.

The electric signal transformed by the receiving optical front end 1214 is delivered to an optical front end amplifier 1213. The optical front end amplifier 1213 is able to amplify the delivered electric signal. The amplified electric signal enters a data/clock recovery unit 1212 to be recovered into a digital data. The recovered digital data can be delivered to the protocol management unit 1201. The protocol management unit 1201 is then able to deliver the received data to the controller 180.

When the above described visible light communication module is implemented within the mobile terminal 100, the respective elements except the transmitting diode 1204 and the receiving optical front end 1214 can be included in the controller 180. And, a function of the transmitting diode 1204 can be replaced by the LED of the backlight unit (BLU) of the display unit 151. Even if the LED BLU is used as a transmitting side of an optical communication, as the LED flickers at the speed unrecognizable by human eyes of a user, any visual inconvenience is caused to the user.

Thus, the mobile terminal 100 is able to work as a transmitting side of a visible light communication without a separate device. When the mobile terminal 100 is provided with an optical front end, it is able to perform both transmitting and receiving functions of the visible light communication.

Figure 10:
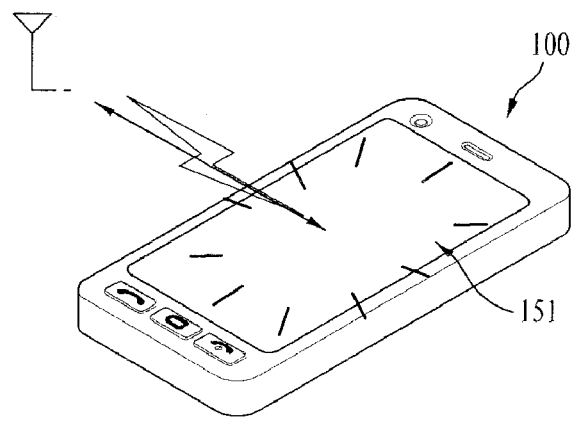
FIG. 10 is a diagram for a concept of performing a visible light communication in a mobile terminal according to another embodiment of the present invention.
Figure 10:
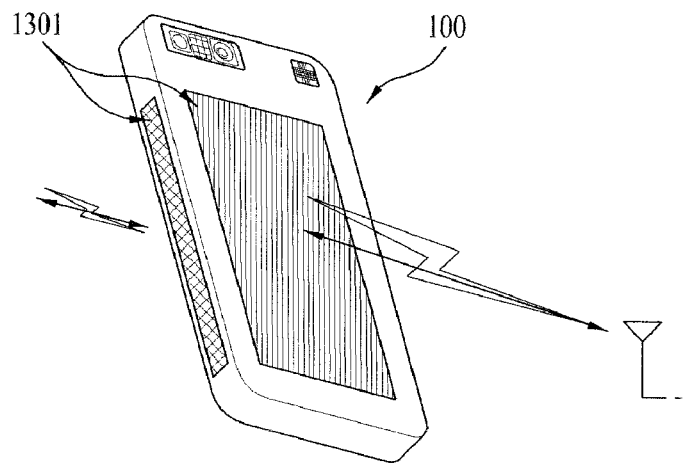
Figure 10:
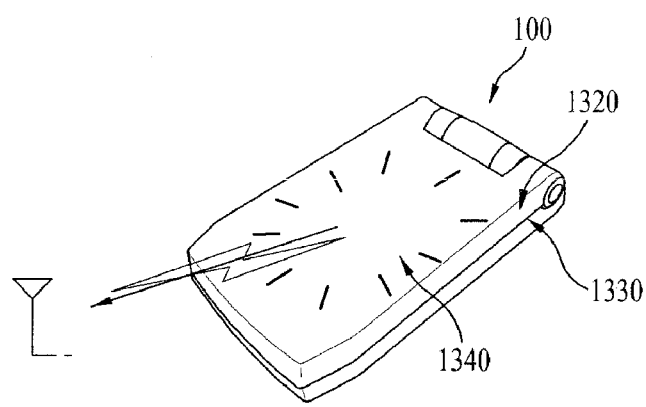

FIG. 10 is a diagram for a concept of performing a visible light communication in a mobile terminal according to another embodiment of the present invention, in which the mobile terminal works as a transmitting and receiving side.

Referring to (a) of FIG. 10, a mobile terminal 100 is able to directly perform a visible light communication via a display unit 151.

Referring to (b) of FIG. 10, the mobile terminal 100 is able to perform the visible light communication via an external illumination unit 1301 formed of a light-transmissive material provided to an outer case as well as the display unit 151 using the external illumination function explained in the description of the second embodiment.

Referring to (c) of FIG. 10, in case that the mobile terminal 100 is a folder type having a top side 1320 and a bottom side 1330 hinged together, a visible light communication can be performed using an external illumination part 1340 formed of a light-transmissive material provided to a top side cover.

By the above described method, a mobile terminal is able to perform a communication with another mobile terminal or a stationary terminal in a manner of using an LED BLU as a transmitting side of visible light communication instead of using a separate LED for the visible light communication. If a receiving optical front end is provided to this mobile terminal, the corresponding mobile terminal is able to perform data exchange wherever an LED illumination for performing a visible light communication is provided.

For instance, a mobile terminal obtains information on a structure of a building via an LED illumination within the building and is then able to display the obtained information. And, a mobile terminal is able to provide the visually handicapped with information on a status of a traffic light though a speaker or vibration using the information obtained from a LED traffic light provided to a crosswalk.

For another instance, if a direction of a relieving optical front end is fixed within a vehicle to a proceeding direction of the vehicle, a mobile terminal obtains traffic information through an LED of a streetlight or a traffic light and is then able to inform a driver of the obtained information via a display unit or a speaker. The mobile terminal obtains information on a deceleration status of a vehicle from an LED tail light of the vehicle and is then able to deliver a warning message to a user.

According to the above described embodiments of the present invention, if a light generated from an LED BLU is used for an external illumination of a mobile terminal, the controller 180 is ale to control a color of light emission as well as an intensity, size and position of the light emission. This is applicable to a BLU designed to emit a white light attributed to a combination of red, green and blue LEDs (i.e., RGB LED) instead of a BLU using an LED emitting a white light only. In other words, the controller 180 controls flickering according to colors of LEDs located at the positions related to an external illumination of an LED BLU, thereby enabling a specific color to appear on the external illumination.

Yet, in this case, since an LED of a specific color emits a light by being intensely located at a specific position, it may affect colors of an LCD. To solve this problem, a color of an LCD corresponding to a part, in which the LED of the specific color is intensely located, is controlled in a direction for compensating for the color of the intensively located LED. For example, if a blue LED is strongly turned on at a specific part of an LED BLU to emit a blue light from an external illumination, a blue component of the color displayed on the corresponding part of an LCD is weakened or a complementary color of the blue is strongly displayed. Therefore, a color change sensed by a user can be minimized.

Meanwhile, according to one embodiment of the present invention, the above-described method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Applicability of the above-described mobile terminal having the display unit provided with the LED backlight is non-limited by the above mentioned mobile terminal including the display unit provided with the LED backlight. Moreover, the embodiments of the present invention can be configured in a manner of being entirely combined together or selectively in part to enable various modifications.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A terminal comprising: a housing; a display comprising: a liquid crystal display provided to one side of the housing; and a backlight including a plurality of light emitting diodes for outputting backlight provided to a backside of the liquid crystal display; and a controller adapted to control the backlight to selectively adjust brightness of the light emitting diodes, wherein the controller is to control one or more objects to be displayed on the display and to selectively control the brightness of at least one of the light emitting diodes corresponding to the one or more objects, wherein the controller is to control at least one of the light emitting diodes located at a first distance from a reference point to emit light by a first brightness and to control one or more light emitting diodes located more than the first distance relative to the reference point to emit light by a second brightness.

2. The terminal of claim 1, wherein the display comprises a touch-screen and wherein the reference point corresponds to a touched position on the touch-screen, the touched position on the screen corresponding to at least one of the one or more objects.

3. The terminal of claim 1, wherein the controller is adapted to control said at least one of the light emitting diodes located to be turned off and wherein the first distance is farther away from the reference point than the second distance.

4. The terminal of claim 1, wherein the display includes a touch screen which is adapted to recognize a contact touch or a proximity touch by discriminating the contact touch or proximity touch from each other and wherein the controller is adapted to control the brightness of said at least one of the light emitting diodes to differ according to a presence of the contact touch or the proximity touch.

5. The terminal of claim 4, wherein the display includes a touch screen which is adapted to discriminatively recognize the proximity touch by at least two steps according to a proximity distance and to control the backlight to differently set the adjusted brightness of the at least one of the light emitting diodes according to each of the at least two steps.

6. The terminal of claim 1, wherein the controller is adapted to control the backlight to control the brightness of light to said at least one or more objects to be different from the brightness of light to at least one other object.

7. The terminal of claim 1, wherein the reference point corresponds to a touched position on a touch screen, wherein the one or more objects corresponds to text including a plurality of rows, and wherein the controller is adapted to control brightness of said at least one of the light emitting diodes at a location.

8. The terminal of claim 1, wherein the terminal is a mobile terminal.

9. A terminal comprising: a display screen; a backlight including light emitting diodes to emit light towards the screen; and a controller to selectively control brightness of light from the light emitting diodes, wherein the controller is to control a first light emitting diode to emit a first level of light and a second light emitting diode to simultaneously emit a second level of light, wherein the first level of light is to illuminate an object on the screen and the second level of light is to illuminate an area on the screen which does not include said object, wherein the first level of light is brighter than the second level of light, wherein the first level of light illuminates the object which includes a first icon having a first preference and the second level of light illuminates said area which includes a second icon having a second preference, and wherein the first preference is greater than the second preference.

10. The terminal of claim 9, wherein the controller controls the first light emitting diode to emit the first level of light to illuminate the object in response to a touch on the screen at a position which corresponds to the object.

11. The terminal of claim 10, wherein the controller controls the first light emitted from the second light emitting diode to decrease from a greater level to the second level after said touch on the screen.

12. The terminal of claim 11, wherein the greater level at least substantially corresponds to the first level of light emitted by the first light emitting diode.

13. The terminal of claim 10, wherein the touch includes any one of a touch at a point, a drag, or a trace.

14. The terminal of claim 10, wherein the touch is a contact touch or a proximity touch.

15. The terminal of claim 9, wherein the object is an icon.

16. The terminal of claim 9, wherein the object is located in a first predetermined region of the screen and the area is in a second predetermined region of the screen exclusive of the first predetermined region.

* * * * *